No. 741,205.        Patented October 13, 1903.

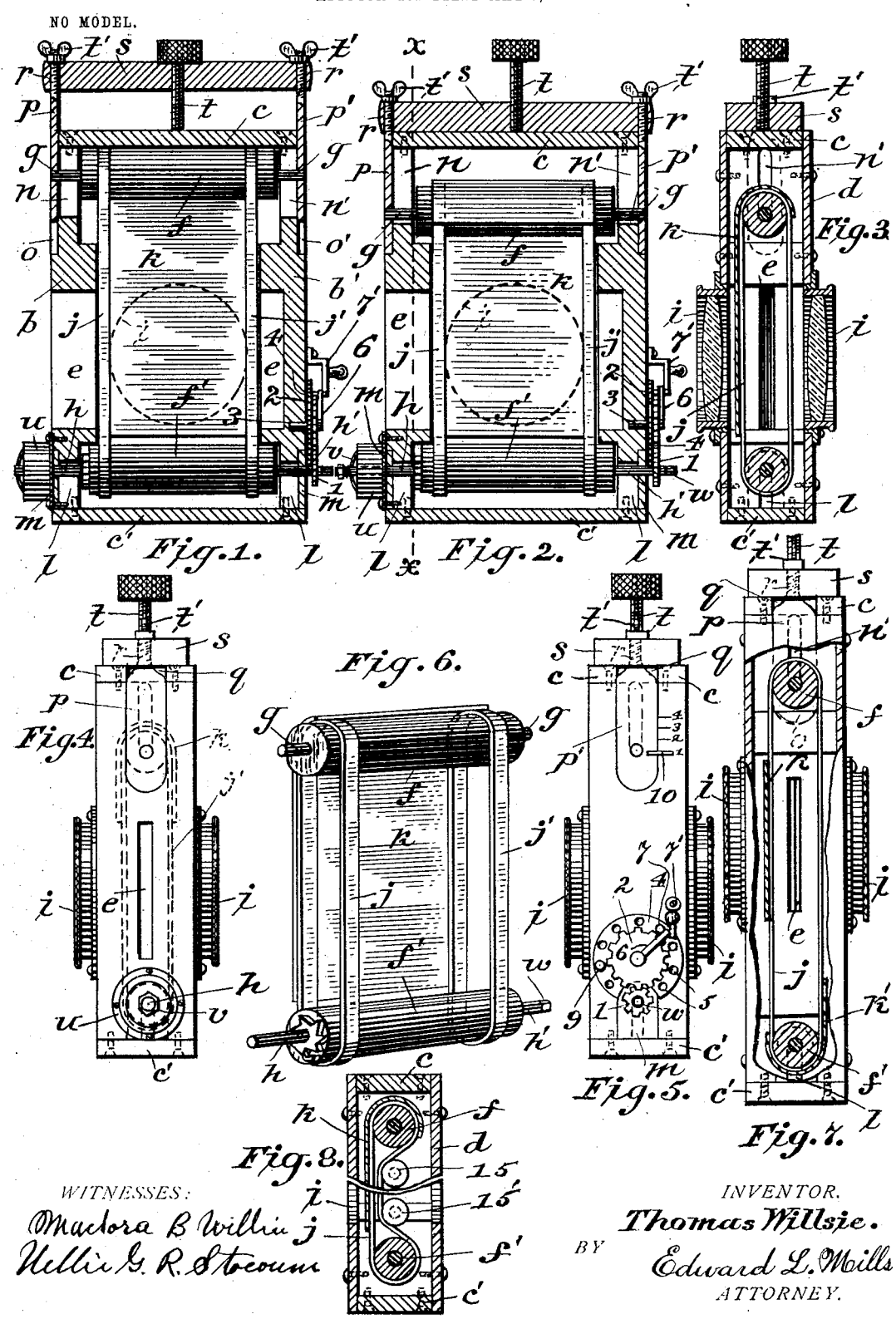

UNITED STATES PATENT OFFICE.

THOMAS WILLSIE, OF IONIA, MICHIGAN.

ADJUSTABLE PHOTOGRAPHIC SHUTTER.

SPECIFICATION forming part of Letters Patent No. 741,205, dated October 13, 1903.

Application filed May 9, 1903. Serial No. 156,354. (No model.)

*To all whom it may concern:*

Be it known that I, THOMAS WILLSIE, a citizen of the United States, residing at Ionia, in the county of Ionia and State of Michigan, have invented certain new and useful Improvements in Adjustable Photographic Shutters; and I do hereby declare the following to be a full, clear, and exact description of the invention, such as will enable others skilled in the art to which it appertains to make and use the same.

My invention relates to improvements in adjustable photographic shutters, the purpose of which is to bring to a perfect balance actinically all the light passing through the lens of a camera to a sensitive film under the varying conditions found to exist in the solar spectrum; and the objects of my device are to provide a shutter which will differentially vary the relative exposure given to the different portions representing the foreground, intermediate and upper sky portions, so that a balanced negative under all conditions is the result obtained by its use, to make possible the correct exposure under the varying existing conditions by giving each ray in the solar spectrum the proper length of exposure according to its different relative actinic value, whether the correct exposure is of the shortest or longest duration, each ray receiving its proper exposure by differentially admitting the light to pass through a lens a longer or shorter time, according to its relative actinic value, so that all parts of a sensitive film are actinically equally exposed, no parts showing under or over exposure as compared with other parts of the same exposure.

It is generally understood that the different rays in the solar spectrum vary in their actinic value approximately as from one to eight. Commencing at the earth, the red rays representing the immediate foreground are of the lowest actinic value, which under certain atmospheric conditions require eight or more times the length of exposure to equally effect a sensitive film as do the upper rays representing the upper or sky portion, which rays from the bottom upward require a relative shorter exposure than the preceding lower rays according to their different actinic value. The relative actinic values above stated do not exist under all the different conditions between the lower and upper rays, for the reason that there is a greater difference between the actinic values of the foreground and upper portions in intense light than when a dull condition exists, so that to properly expose equally a sensitive film according to the varying conditions as above stated I have so constructed a shutter adapted to enable the operator to differentially vary the relative exposure given to the different portions representing the foreground, intermediate and sky portions, so that a balanced negative under all of the varying conditions named is the result, whether the proper exposure be found to be as from one to eight or from one to some higher or lower number than eight.

My invention consists in the construction and arrangements of its parts, which will be more fully hereinafter described, and definitely pointed out in the claims, the objects of which are obtained by means of the mechanism herein described, and illustrated by the accompanying drawings, in which—

Figure 1 is a longitudinal vertical section and part elevation of my improved adjustable photographic shutter as it appears with its interior mechanism extended to its farthest limit, also the means for adjusting the same. Fig. 2 is a longitudinal vertical section and part elevation of the same with its interior mechanism contracted to its shortest limit. Fig. 3 is a perpendicular transverse section of my improved adjustable shutter, taken on line $x\,x$ of Fig. 2, showing its interior mechanism mounted between a lens in combination with the case within which it is secured. Fig. 4 is a perpendicular longitudinal side elevation of my device, showing an improved means for regulating the speed of the same. Fig. 5 shows a reversed side view of my improved adjustable shutter with improved adjustable releasing and stopping device attached thereto, also indicator for use in indicating the different adjustments required for the different actinic quality of light in making a proper exposure. Fig. 6 is a perspective view of the interior mechanism of my improved adjustable shutter as being detached therefrom. Fig. 7 is a vertical sectional side view of a modified form of the same. Fig. 8 is a vertical longitudinal broken section of another modified form of my improved photographic shutter.

Referring to the drawings, the case proper of my improved adjustable shutter is composed of six parts—viz., $a$, $b$, $c$, $c'$, and $d$, the latter or front plate of Figs. 1 and 2 and the side plate $b$ of Figs. 3 and 8 being removed therefrom. $e$ indicates a longitudinal slot in which to place an ordinary diaphragm. The side portions $b$ and $b'$, composing a part of the case, are made thinner at their top and bottom ends, the purpose of which will hereinafter appear.

$f$ and $f'$ are rollers mounted on shafts having extended journals $g$ $g$ and $h$ $h'$.

$i$ indicates the lens-opening. (Shown in Figs. 1, 2, 3, 4, 5, and 7.

$j$ and $j'$ are endless bands, elastic in quality, which extend around the circumferential surfaces of rollers $f$ and $f'$ near their outer ends, the perpendicular parallel portions of said bands being outside of the lens-opening at a right angle to the horizontal center thereof, as shown.

Attached to the endless elastic bands $j$ $j'$ is an opaque flexible non-elastic curtain $k$, which extends from a point slightly below the lens-opening to a point varying. (Shown in Figs. 1 and 2.)

The side portions $b$ and $b'$ are thinner at their top and bottom inner ends, the purpose of which is to accommodate the length of rollers $f$ and $f'$ necessary to keep the curtain $k$ and bands $j$ and $j'$ from running off the ends of said rollers $f$ and $f'$.

$l$ and $l$ are slots formed in the lower ends of the side portions $b$ and $b'$. $m$ and $m$ are journal-plates inserted in the outer surfaces of said side portions $b$ and $b'$ near their bottom ends, through which extend the journals $h$ and $h'$.

$n$ and $n'$ are slots formed in the upper ends of the side portions $b$ and $b'$, in which are interposed the journals $g$ and $g$.

$o$ and $o'$ are longitudinal grooves formed in the upper and outer sides of the portions $b$ and $b'$.

$p$ and $p'$ are adjustable hangers, in which the journals $g$ $g$ are supported near their lower ends.

$c$ is the upper portion of the case, having grooves $q$ and $q'$ formed therein, which grooves $q$ $q'$ in combination with slots $n$ and $n'$ and $o$ and $o'$ form guides for the adjustable hangers $p$ and $p'$. The upper ends of said hangers $p$ and $p'$ are formed round, having threads $r$ $r$ thereon, which threads extend through holes in the outer ends of an adjusting-plate $s$. Thumb-nuts $t'$ and $t'$ are provided at the outer ends of the adjustable hangers $p$ and $p'$ for the purpose of adjusting the journals $g$ $g$ and roller $f$ to a true horizontal position parallel to the roller $f'$.

$t$ is an adjustable screw, used for raising or lowering the roller $f$.

$u$ is a tubular flanged case, which is secured to the lower outer side portion $b$ of the case, having inclosed therein a coiled spring, one end of which is secured to said tubular flanged case $u$ on its inner surface and the other end to the journal $h$, the purpose of which coiled spring is to operate the inner mechanism of my improved adjustable photographic shutter, as well as the outer side portions thereof. At the outer end of the flanged case $u$ a cup-shaped friction-plate $v$ is mounted on the journal $h$, against which is placed a spiral spring encircling said journal $h$, on the outer end of which is an adjusting-nut, the purpose of which is to bear against the plate $v$ in order to retard the action of the spring and motion of the rollers $f$ and $f'$ when it is desired to reduce the speed of said rollers $f$ and $f'$ Referring to Fig. 5, a portion of which is a side elevation of my improved adjustable releasing and stopping device, which consists of gear wheels or pinions 1 and 2, one of which is secured to the extended portion of the journal $h'$ and the other mounted on a pin 3, secured within the side portion $b'$ of the shutter-case, 4 is a circular plate secured to the side portion $b'$ of the shutter-case, having the pin 3 extending through it. 5 represents holes extending through said circular plate 4 near its outer circumferential surface, the purpose of which holes 5 is to provide a means for holding a pin inserted therein to bring to a stop the action of the curtain $k$ at any desired portion of its travel, one position of the curtain $k$ being shown in dotted lines, Fig. 4, for the purpose of focusing or a time exposure. 6 is an arm extending outward from the center of the wheel or pinion 2, being integral therewith, the purpose of which is to provide a means, in combination with a pin 7 and latch 7', for securing the curtain $k$ when in its lowest position, covering the lens-opening $i$. Another pin 9 is provided, which may be inserted within any of the holes 5, the purpose of which is to arrest the curtain $k$ at any other portion of its travel, as well as in the position shown in Fig. 5. $w$ is a square projection formed on the outer end of journal $h'$, on which a key may be placed to wind or unwind the actuating-spring contained within the tubular flanged case $u$ for the purpose of giving a higher or lower speed to the curtain $k$.

Referring to Figs. 1, 2, and 3, the roller $f'$ has a shaft on which it is mounted, said shaft having journals $h$ and $h'$, which extend through journal-plates $m$ $m$ to support the roller $f'$. Secured to one end of roller $f'$ is a pawl which engages with a ratchet-wheel secured to the journal $h$ for holding the journal $h$ while the spring within the case $u$ is being wound without moving the curtain $k$. The hanger $p'$ has secured to its outer surface a small projecting arm 10, used in combination with the horizontal or index lines 1 2 3 4 to indicate the different positions in which roller $f$ may be placed, one position of which is shown in Fig. 2.

Referring to Fig. 7, which is a vertical sectional side view of a modified form of my improved adjustable qualifying and graduating photographic shutter, the curtain $k$ is shown in two sections, $k$ and $k'$, secured to endless elastic bands $j$ and $j'$. Section $k$, as shown, is placed in front of the lens-opening $i$ and is of sufficient length to close said opening $i$ and section $k'$, one end of which is placed a sufficient distance below said lens-opening $i$ so that the light is admitted to the lens between the ends of the sections $k$ and $k'$ horizontally and gradually upward to its top, said opening between the ends $k$ and $k'$ being variably adjusted and operated by the same means as shown in Figs. 1, 2, 4, and 5.

Referring to Fig. 8, the curtain $k$ and endless elastic bands $j$ and $j'$ are shown as placed close to each other by means of idlers 15 and 15′, 16 and 16′, placed near the perpendicular inner surface of the side portions $b$ and $b'$ of the case which contains them, at both sides thereof, outside the lens-opening, for the purpose of accommodating closely-mounted lenses.

The operation of my device is as follows: Suppose it is desired to make an exposure of one second duration with the rollers $f$ and $f'$ in position as shown in Figs 2 and 3. The bottom horizontal portion receives one second exposure, and the top horizontal portion receives one-eighth of a second, the relative difference being eight times between the top and bottom portions of the lens-opening. Then by adjusting the rollers $f$ and $f'$ a greater distance apart (shown in Fig. 1) by means of adjusting-screw $t$, without changing the time of exposure, all portions receive an equal additional length of exposure. The bottom horizontal portions receive, say, one and one-half seconds exposure, the top horizontal portion receives five-eighths of a second exposure, the relative difference being two and four-tenths times between the top and bottom of the exposure. In the first instance, the curtain $k$ having one end below the lens-opening $i$ and the other end at a point equal to the diameter of the lens-opening $i$ above or from said lens-opening $i$ and set when sprung or released, the ends of curtain travel in opposite directions, causing the bottom end of curtain $k$ to move gradually horizontally upward to the top of lens-opening $i$. The other end of curtain $k$ is now at the same point—viz., the top of lens-opening $i$—and moves gradually horizontally downward to a point sufficiently below the lens-opening $i$ to entirely shut off all light passing through it. The desired exposure having been made, the relative difference of exposure between the two extremes of bottom and top portions are as from one-eighth of a second to one second. In the second instance named, by adjusting the roller $f$ to a greater distance above the lens-opening $i$, as shown, made possible by the elastic bands $j$ and $j'$ and adjusting-screw $t$, the ends of curtain $k$ are separated farther apart. Being again set backward by means of a key provided for this purpose, the roller $f'$ and curtain $k$ are brought to the same position as before an exposure was made. When sprung or released, the ends of curtain $k$ travel as before stated. The bottom end moves gradually upward horizontally, uncovering the lens-opening $i$. The other end of curtain $k$, however, having not yet reached the point of commencing to close the lens-opening $i$, is, say, one-half the diameter of the lens-opening $i$ above said opening, giving to the top, as well as all other portions of lens-opening $i$, the extra time required by curtain $k$ to travel the extra distance made by the adjustment of the roller $f$, the relative difference of exposure between the two extremes of the top and bottom portions being as five-eighths of a second to one and one-half seconds. By adjusting the roller $f$ a still greater distance from roller $f'$ the end of curtain $k$ which closes the lens-opening $i$ is a greater distance from the top of said lens-opening $i$— say three-fourths of its diameter. The relative difference is as from seven-eighths of a second to one and three-fourths seconds, or, in other words, the upper portion receives one-half of the exposure, as does the lower portion.

The above description of the operation of my device is only illustrative of a few of the many adjustments and positions in which the relative difference of exposure may be made to suit any difference in the actinic qualities of light. The speed or time of exposure above referred to is also only to illustrate how the variation in timing between the upper and lower portions are made. The same relative difference exists in the shortest possible exposure as well as in an exposure of the longest duration, as the difference in the relative exposure between the top and bottom portions is due to the difference in the position of the rollers $f$ and $f'$.

It will be understood that the flexible non-elastic curtain $k$ is secured to a portion of the endless elastic bands $j$ and $j'$, and while making the different adjustments between the rollers $f$ and $f'$ the only parts lengthened are in a portion of the endless elastic bands $j$ and $j'$, which are not secured to the flexible non-elastic curtain $k$.

Referring to my improved adjustable releasing and stopping device shown in Fig. 5, suppose the rollers $f$ and $f'$ to be in position as shown in Figs. 2 and 3. The stopping-pin 9 is placed a proper distance from the releasing-latch 7′ in one of the holes in circular plate 4 to bring to rest the closing end of curtain $k$ at a proper point to close the lens-opening $i$. When the roller $f$ is in position as shown in Fig. 1, the pin 9 is placed farther from the releasing-latch 7′ a proper distance to correspond with the increased travel required to bring the closing end of curtain $k$ to a position to close the lens-opening $i$. Referring to the hanger $p'$, having a horizontal index-arm 10 attached thereto, the numeral 1 at the end of said horizontal index-arm 10 indicates the position of roller $f$ at a time when the greatest difference exists in the actinic value of intense light as between the foreground, intermediate, and sky portions of a landscape. Numerals 2, 3, and 4 represent the proper position of adjustable roller $f$ for the varying conditions of light, such as bright, dull, and very dull, in the order named.

Having thus described my invention, what I claim as new, and desire to secure by Letters Patent, is—

1. An adjustable, qualifying, graduating and interchangeable photographic curtain-shutter, comprising a photographic-shutter case having slots formed in its lower side portion, and slots and grooves in its upper side portion, front and back plates $d$, and top and bottom plates $c$, and $c'$, removably secured thereto, with two rollers mounted on shafts having extended journals interposed within said slots, two of which are mounted in plates secured to the side portions of the photographic-shutter case, at its lower end, the other two, in two adjustable hangers interposed within said grooved portions, at its upper end, the other outer ends of which adjustable hangers have round, threaded projections, which projections extend through holes near the ends of an adjusting-plate at the upper end of the photographic-shutter case, a flexible, opaque curtain having two endless, elastic bands secured thereto, mounted on the rollers within the shutter-case, and means for operating said rollers and curtain, which curtain is adapted to admit the light to pass differentially through the lens of a camera from its bottom, gradually, horizontally upward to its top, and to close the opening from its top gradually, horizontally downward to its bottom.

2. The combination with the photographic-shutter case having slots formed in its lower side portions, and slots and grooves in its upper side portions, of two rollers mounted on shafts having extended journals interposed within said slots, two of which are mounted in plates secured to the side portions of the case at its lower end, and the other two, in two hangers interposed within the grooved portions near their lower ends, in combination with two endless, elastic bands, mounted thereon, having a flexible, non-elastic curtain secured to said endless, elastic bands, the whole being adapted to travel thereon, by means substantially as described.

3. The combination with the photographic-shutter case having slots formed in its lower side portions, and slots and grooves in its upper side portions, of two rollers mounted on shafts having extended journals interposed within said slots, two of which are mounted in plates secured to the side portions of the case at its lower end, and the other two, in two hangers interposed within said grooved portions, at its upper end, the outer ends of which hangers have round, threaded projections, which projections extend through holes near the ends of an adjusting-plate at the upper end of the case, in combination with two endless, elastic bands, mounted on said rollers having a flexible, non-elastic curtain secured to said bands, and means for adjustably securing and holding the same within said photographic-shutter case, substantially as described.

4. The combination with the photographic-shutter case, having slots formed in its lower side portions, and slots and grooves in its upper side portions, of two rollers mounted on shafts having extended journals interposed within said slots, two of which are mounted in plates secured to the side portions of the photographic-shutter case at its lower end, the other two, in two adjustable hangers interposed within said grooved portions, at its upper end, the outer ends of which adjustable hangers have round, threaded projections, which projections extend through holes near the ends of an adjusting-plate at the upper end of the photographic-shutter case, in combination with two endless, elastic bands mounted on said rollers having a flexible non-elastic curtain secured to said endless, elastic bands, and means for raising, lowering and securing the same, substantially as described.

5. In an adjustable photographic shutter, a photographic-shutter case having slots formed in its lower side portion, and slots and grooves in its upper side portion, adapted for adjusting and removing the inner mechanism of said photographic shutter, comprising two rollers mounted on shafts having extended journals interposed within said slots, and a flexible, opaque curtain with two endless, elastic bands secured thereto, mounted on said rollers, and means for adjusting and securing the same, substantially as described.

6. In an adjustable photographic shutter, the combination with the rollers $f$, and $f'$, the endless, elastic bands $j$, and $j'$, and the flexible, non-elastic curtain $k$, substantially as described.

7. In a photographic shutter, the combination with the journals $h$, and $h'$, mounted in plates $m$, and $m$, secured within the lower side portions $b$, and $b'$, of the photographic-shutter case, the tubular flanged case $u$, having a coiled spring contained therein, one end of which is secured to the journal $h$, and the other to the inner, circumferential surface of said tubular flanged case $u$, in combination with a cup-shaped friction-plate $v$, and spiral spring mounted on the journal $h$, and means for pressing said spiral spring and cup-shaped friction-plate $v$, against said tubular flanged case $u$, substantially as described.

8. The combination with the roller $f'$, journal $h$, and spring within the tubular flanged case $u$, the ratchet-wheel $u'$, and pawl $v'$, substantially as described.

9. In an adjustable, photographic shutter, an adjustable releasing and stopping device consisting of two pinions 1, and 2, one of which is secured to the extended portion of the shaft $h'$, the other loosely mounted on a pin 3, secured within the photographic-shutter case, the outer surface of which pinion 2, has a projecting arm 6, secured thereto, in combination with a circular plate 4, secured to said photographic-shutter case, and having a series of holes 5, formed therein near its outer circumferential surface, said holes 5, being adapted to receive adjusting, stopping-pins 7, and 9, therein, one of which the arm 6, abuts, being held by a latch 7', before it is released, and the other forming a stop to said arm 6, after it is released, substantially as described.

10. In an adjustable photographic shutter, the adjustable hanger $p'$, having a horizontal index-arm 10, secured thereon, in combination with the index-lines 1, 2, 3, and 4, on the side portions $b'$, of the photographic-shutter case, substantially as described.

In testimony whereof I affix my signature in presence of two witnesses.

THOMAS WILLSIE.

Witnesses:
MADORA B. WILLSIE,
NELLIE G. R. STOCOUM.